United States Patent
Fernandez Alonso et al.

(10) Patent No.: US 9,118,730 B2
(45) Date of Patent: Aug. 25, 2015

(54) EFFICIENT DATA DELIVERY METHOD AND APPARATUS

(75) Inventors: Susana Fernandez Alonso, Madrid (ES); Victor Manuel Avila Gonzalez, Madrid (ES); Roberto David Carnero Ros, Madrid (ES); Ibon Gochi Garcia, Algorta (ES); Ana Maria Lopez Nieto, Madrid (ES); Maria Belen Pancorbo Marcos, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 249 days.

(21) Appl. No.: 13/696,349

(22) PCT Filed: May 28, 2010

(86) PCT No.: PCT/EP2010/057454
§ 371 (c)(1),
(2), (4) Date: Nov. 6, 2012

(87) PCT Pub. No.: WO2011/147466
PCT Pub. Date: Dec. 1, 2011

(65) Prior Publication Data
US 2013/0054800 A1 Feb. 28, 2013

(51) Int. Cl.
*G06F 15/16* (2006.01)
*H04L 29/08* (2006.01)
(Continued)

(52) U.S. Cl.
CPC .......... *H04L 67/2842* (2013.01); *H04L 29/06* (2013.01); *H04L 29/08072* (2013.01); *H04L 47/10* (2013.01)

(58) Field of Classification Search
CPC .......................... H04L 29/08072; H04L 47/10
USPC .............. 709/223, 228, 220; 455/406; 726/1
See application file for complete search history.

(56) References Cited

U.S. PATENT DOCUMENTS 8,379,599 B2 * 2/2013 Velev et al. .................. 370/331
8,694,619 B2 * 4/2014 Mariblanca Nieves ....... 709/223
(Continued)

FOREIGN PATENT DOCUMENTS

| CN | 101159563 | 4/2008 |
| CN | 101552682 | 10/2009 |
| CN | 101589589 | 11/2009 |

OTHER PUBLICATIONS

3GPP TS 23.203 V9 3.0, 3$^{rd}$ Generation Partnership Project; Technical Specification Group Services and System Aspects; Policy and charging control architecture (Release 9), Dec. 2009, pp. 1-123.
(Continued)

*Primary Examiner* — Khanh Dinh
(74) *Attorney, Agent, or Firm* — Nixon & Vanderhye, P.C.

(57) ABSTRACT

A method of delivering data to user terminals connected to an Internet Protocol Connectivity Access Network, IP-CAN, wherein the IP-CAN implements a Policy and Charging Control, PCC, architecture. The method comprises caching data within an IP-CAN cache server upon a decision made by a Policy and Charging Rules Function, PCRF, of the PCC architecture. The cached data is then identified to a Policy and Charging Enforcement Function, PCEF, of the PCC architecture. At the PCEF, data requests made by user terminals are monitored and a determination made as to whether or not a request relates to cached data. If a request does relate to cached data, then that cached data is delivered from the IP-CAN cache server to the requesting user terminal.

15 Claims, 7 Drawing Sheets

(51) Int. Cl.
*H04L 12/801* (2013.01)
*H04L 29/06* (2006.01)

(56) References Cited

U.S. PATENT DOCUMENTS

| | | | |
|---|---|---|---|
| 2004/0087304 | A1 | 5/2004 | Buddhikot et al. |
| 2008/0159313 | A1 | 7/2008 | Rasanen |
| 2010/0034089 | A1 | 2/2010 | Kovvali et al. |
| 2011/0201303 | A1* | 8/2011 | Cutler et al. .................. 455/406 |
| 2011/0270722 | A1* | 11/2011 | Cai et al. ......................... 705/34 |
| 2011/0276529 | A1* | 11/2011 | Vihtari ............................ 706/47 |
| 2012/0210003 | A1* | 8/2012 | Castro et al. .................. 709/225 |
| 2012/0269061 | A1* | 10/2012 | Kekki ............................ 370/230 |

OTHER PUBLICATIONS

English translation of Chinese Search Report dated Sep. 23, 2014 in CN 201080067103.X, 2 pages.

International Search Report for PCT/EP2010/057454, mailed Oct. 14, 2010.

"3$^{rd}$ Generation Partnership Project: Technical Specification Group Services and System Aspects; Study on Policy solutions and enhancements (Release 10)", *3GPP Standard, 3GPP TR 23.813, 3$^{rd}$ Generation Partnership Project (3GPP)*, no. VO.1.1, Jan. 7, 2010, pp. 1-18.

* cited by examiner

EFFICIENT DATA DELIVERY METHOD AND APPARATUS

This application is the U.S. national phase of International Application No. PCT/EP2010/057454 filed 28 May 2010 which designated the U.S., the entire content of which is hereby incorporated by reference.

TECHNICAL FIELD

The present invention relates to an efficient data delivery method and apparatus for implementation within an IP Connectivity Access Network. The method and apparatus is applicable in particular, though not necessarily, to a 3GPP IP Connectivity Access Network.

BACKGROUND

Some current web services rely on content delivery networks (CDN) to distribute data from content providers (CPs) to end users. A CDN can be defined as a system of servers (referred to hereinafter as "content servers") placed at various points in a data network (e.g. the Internet, an intranet, etc) and containing cached copies of certain data (as provided from the CPs) so as to improve access to the data from clients. In general, CDNs are configured to allow a client to access a copy of the data near to the client, as opposed to all clients accessing the same (i.e. central) content server. Caching of content in CDNs offers considerable advantages including load distribution and improved response times to clients.

A client can be, for example, user terminal equipment (UE) of a user connectable to a network system arranged to provide data connectivity access to end user equipment (UEs). A network system arranged to provide data connectivity access to end user equipment is referred to here as an Internet Protocol (IP) Connectivity Access Network, IP-CAN. One example of an IP-CAN is a 3GPP mobile telecommunication network system that facilitates data connectivity access to users of UEs, such as the network system of an operator providing a GPRS service, or any other kind of packet-switched based access network system. A CDN can comprise content servers that can also be located within the network domain of operators providing an IP-CAN; that is, a network operator providing an IP-CAN can also be a CDN operator.

Content susceptible to caching is generally of a static nature and is not user specific, and has some considerable size. Examples of content susceptible to caching include, for example, images, data files, video files and multimedia streams.

Content delivery and caching solutions available currently often rely on an explicit agreement between the CP and the CDN to select cacheable material. Subsequently, the material is distributed across servers of the CDN—in according with the agreements—and is kept updated therein. This implies storing and maintaining a considerable volume of data within the CDN caches. Furthermore, the current solutions make the setup and maintenance of a caching scheme expensive and difficult to implement, since it implies that caching and updating policies—as determined by the agreements between the CPs and CDN operators—has to be implemented by CDN servers. This can have a special significance for CDN operators having to deal with cached content belonging to a plurality of CPs.

Moreover, telecommunication operators that provide user terminals with access to data networks (e.g. GSM/GPRS/UMTS operators providing IP-CAN access) can face high transmission costs (i.e. peer costs) for fetching content that is cached in a CDN that can belong to the network domain of a different operator, especially where that CDN is located in a different geographical region. For example, a subscriber located within the Philippines may be accessing web information cached in California.

SUMMARY

It is an object of the present invention to overcome or at least mitigate some of the disadvantages of known caching approaches, and to do this in an efficient manner which utilises, where possible, existing network elements.

According to a first aspect of the present invention there is provided a method of delivering data to user terminals connected to an Internet Protocol Connectivity Access Network, IP-CAN, wherein the IP-CAN implements a Policy and Charging Control, PCC, architecture. The method comprises caching data within an IP-CAN cache server upon a decision made by a Policy and Charging Rules Function, PCRF, of the PCC architecture. The cached data is then identified to a Policy and Charging Enforcement Function, PCEF, of the PCC architecture. At the PCEF, data requests made by user terminals are monitored and a determination made as to whether or not a request relates to cached data. If a request does relate to cached data, then that cached data is delivered from the IP-CAN cache server to the requesting user terminal.

The method may comprise performing Deep Packet Inspection on certain traffic flows through the IP-CAN, and reporting the DPI results to a Policy and Charging Rules Function, PCRF, of the PCC architecture. At the PCRF, a decision is made to cache data in the IP-CAN cache server on the basis of said results. Said step of identifying the cached data to the PCEF comprises sending the identification of the cached data from the PCRF to the PCEF.

The step of sending the identification of the cached data from the PCRF to the PCEF may comprise including this identification within a provision of PCC Rules sent from the PCRF to the PCEF in respect of, and applicable to, traffic flows associated with IP-CAN sessions of a given user terminal. Alternatively, or in addition, the step of sending the identification of the cached data from the PCRF to the PCEF may comprise including this identification in a provision of PCC Rules sent from the PCRF to the PCEF in respect of, and applicable to, traffic flows associated with IP-CAN sessions of all the user terminals associated with the PCEF. The PCRF may additionally send the identification of the cached data to one or more further PCEFs within the PCC architecture.

A step of performing Deep Packet Inspection may be carried out at a Traffic Decision Function, TDF, of the PCC architecture, with the TDF being implemented either within a standalone network node or within a node implementing a PCEF.

The step of making a caching decision on the basis of said results at the PCRF may comprise incrementing a counter specifying a number of retrievals of a data item or set of items identified in the result, and caching the data item or set of items if the counter value has reached some predefined value.

The step of delivering cached data to the requesting user terminal may comprise sending a redirect request from the PCEF to the user terminal to cause the user terminal to request the cached data from the IP-CAN cache server.

The cached data may be identified to the Policy and Charging Enforcement Function by way of a Service-Uniform Resource Locator, URL.

According to a second aspect of the invention there is provided apparatus configured to implement a Policy and Charging Rules Function, PCRF, within a Policy and Charging Control architecture of an Internet Protocol Connectivity Access Network, IP-CAN. The apparatus comprises a receiver for receiving Deep Packet Inspection results on certain traffic flows through the IP-CAN, and a decision unit for making caching decisions to cache data on the basis of said results. There is further provided a cache controller for responding to caching decisions of the decision unit by caching data within an IP-CAN cache server, and a sender for identifying the cached data to one or more Policy and Charging Enforcement Functions, PCEFs, of the PCC architecture.

The sender may be configured to send to the or each PCEF, Provision PCC Rules requests containing identifications of cached data, or globally applicable rules containing the identifications, with the decision unit being configured to maintain a counter recording a number of retrievals of a data item or set of data items as reported by the DPI, and to make a decision to cache the data item or set of data items when the counter value has reached some predefined value.

According to a third aspect of the invention there is provided apparatus configured to implement a Policy and Charging Enforcement Function, PCEF, within a Policy and Charging Control architecture of an Internet Protocol Connectivity Access Network, IP-CAN. The apparatus comprises a receiver for receiving from a Policy and Charging Rules Function, PCRF, an identification of data cached within the IP-CAN, and a monitor for monitoring data requests made by user terminals and for determining if a request relates to cached data based upon said identification. There is further provided a controller for causing a user terminal to retrieve cached data from the IP-CAN cache in the event that such a determination is made.

Said identification may be a Service Uniform Resource Locator, Service-URL, and said monitor is configured to monitor requests to identify request that relate to that Service URL. In this case, the controller may be configured to cause a user terminal to retrieve cached data from the IP-CAN cache by sending a redirection request to the user terminal containing a cached service URL.

DETAILED DESCRIPTION

A mechanism will now be described that allows some content to be efficiently cached by, and retrieved from, a Cache Server within a network domain of an operator providing data connectivity access to end user equipment (UEs). Caching and caching retrieval decisions involve the cooperation of nodes already defined for the 3GPP "Policy and Charging Control" architecture PCC, such as the Policy and Charging Rules Function (PCRF) and the Policy and Charging Enforcement Function (PCEF), with embedded or cooperating deep packet inspection (DPI) capabilities.

Figure 1:
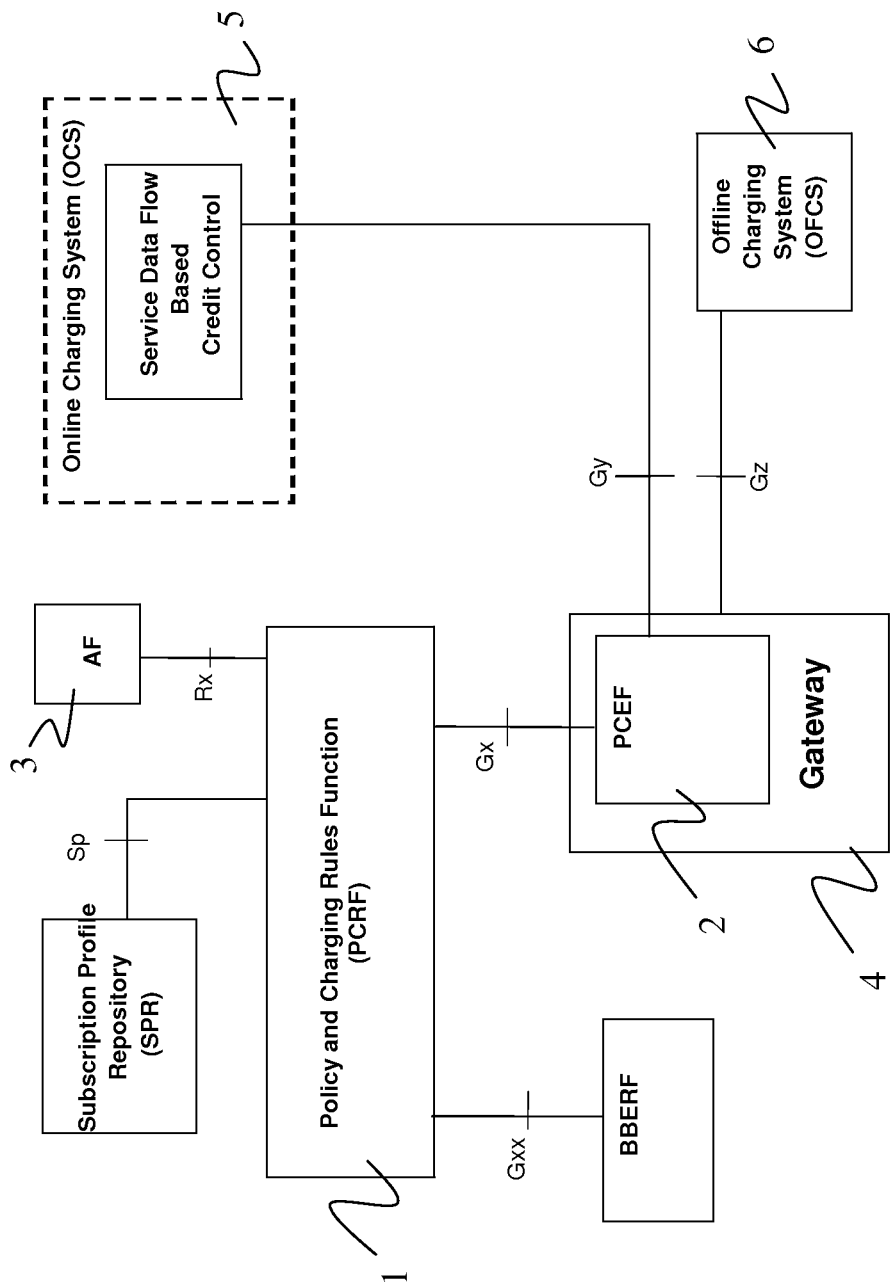
FIG. 1 illustrates schematically elements of a Policy and Charging Control (PCC) architecture.

A simplified architecture for supporting Policy and Charging Control (PCC) functionalities is illustrated in FIG. 1. The Figure shows certain functional entities (nodes) and is taken from 3GPP TS 23.203 (V.9.3.0) which specifies PCC functionalities for an Evolved 3GPP Packet-switched network System (EPS), including both 3GPP accesses (GERAN/UTRAN/E-UTRAN) and Non-3GPP accesses, and which is also adapted for interworking with nodes of legacy mobile packet systems. The EPS system referred in 3GPP TS 23.203, which incorporates PCC specific elements, is an example of an Internet Protocol Connectivity Access Network, IP-CAN.

The PCRF 1 is a functional element that encompasses policy control decision and flow based charging control functionalities. The PCRF provides network control regarding the service data flow detection, gating, QoS and flow based charging (except credit management) towards the PCEF 2. The PCRF can receive session and media related information from an Application Function (AF) 3 and can also inform the AF of traffic plane events. The PCRF provisions PCC Rules to the PCEF 2 via the Gx reference point.

The PCEF 2 is a functional element that encompasses policy enforcement and flow based charging functionalities. This functional entity is located at a gateway node 4 of the network (e.g. GGSN in the GPRS case, and PDG in the WLAN case). The PCEF provides control over user plane traffic handling at the gateway 4 and in particular over the applied Quality of Service (QoS). It provides service data flow detection and counting as well as online and offline charging interactions, e.g. towards the OCS 5 and OFCS 6. FIG. 1 also illustrates a Bearer Binding and Event Reporting Function (BBERF) and Subscriber Profile Repository.

The AF 3 is a functional element implementing applications for which a service is delivered to a user terminal (UE) The AF controls IP bearer resources in order to satisfy the requirements of the service. One example of an AF is a Proxy Call Service Control Function P-CSCF of an IP Multimedia Subsystem (IMS) core network. The AF 3 communicates with the PCRF 1 to transfer dynamic session information. This communication is performed using the Rx interface.

Figure 2:
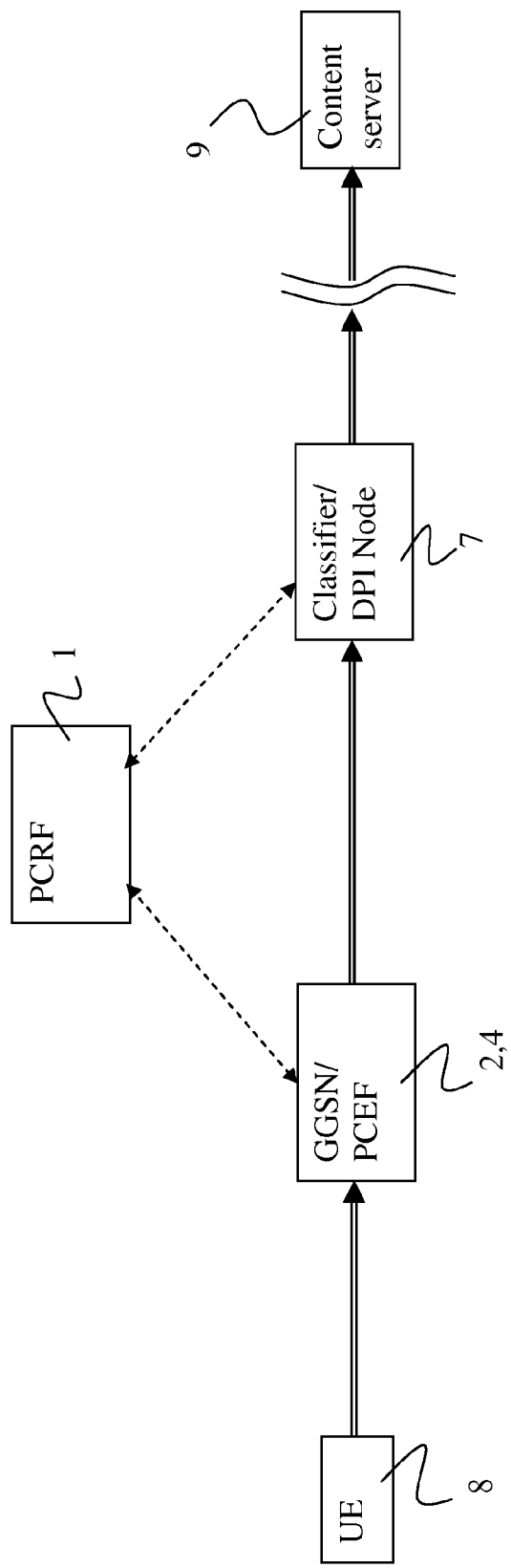
FIG. 2 illustrates schematically elements of an IP Connectivity Access Network incorporating elements of a PCC architecture and including a Deep Packet Inspection (DPI) function.

In 3GPP Rel-10, TR 23.813, v.0.1.1 (study on policy solutions and enhancements) considers an architecture to provide service traffic detection mechanisms. This architecture contemplates a so-called "Traffic Detection Function" (TDF). Upon detecting a service with a service traffic detection mechanism, the TDF informs the PCRF of the detected service. The PCRF can then react in some desired way with regard to the policy and charging control information for the detected traffic. TR 23.813 contemplates two alternatives for communication between the TDF and the PCRF, one based on Rx and the other based on Gx. The TDF terminology used in the standard corresponds to the Deep Packet Inspection (DPI) terminology used in the discussion below. FIG. 2 illustrates schematically elements of an IP Connectivity Access Network IP-CAN (1, 2, 4, 7) incorporating elements of a PCC architecture (PCRF, PCEF). FIG. 2 further illustrates the implementation of a DPI node 7 within the IP-CAN, the Figure also illustrating an example end user equipment (UE) 8 and an example (web) Content server 9. The TDF/DPI functionalities can be performed by the illustrated DPI node (7), or can be co-located within the node implementing PCEF functions (GGSN/PCEF, 2, 4).

A packet data flow (such as an IP flow) is a set of data packets (e.g. IP packets) passing a routing node in a packet data network during a certain time interval, to or from the same endpoints. For example, a packet flow may be an IP flow, where each packet of the flow contains the same values of source IP address, source transport layer port (e.g. TCP), destination IP address and destination transport layer port.

When a User Equipment (UE) initiates a data session (e.g. an IP-CAN session), a packet data network address, such as an IP address, is assigned to it by an appropriate access gateway, e.g. the GGSN of FIG. 2. The PCEF within the gateway provides this IP address, together with, for example, an NAI, IMSI, or MSISDN, to the PCRF which in turn downloads into the PCEF a set of policy rules to be applied to the data session. When the UE communicates with an AF, e.g. a P-CSCF in the case of an IMS service architecture, the AF provides session details to the PCRF. When the UE subsequently requests resources for the service provided by the AF, the PCRF downloads into the PCEF a further set of policy rules based on the session details provided by the AF.

Typically, a policy rule comprises a so-called IP 5-Tuple vector describing a data packet flow within a data session (namely; orig IP-addr/port, dest IP-addr/port, protocol-TCP/UDP). The PCEF inspects packets to detect the relevant tuples and apply the rules. However, this technique allows only a limited (coarse) analysis of packets, as it does not allow packet inspection beyond these five IP headers, e.g. it does not allow inspection of payload data.

DPI is a mechanism that can be deployed at an intermediate node within an IP network in order to inspect fields within packets of an IP flow at a level "beneath" the fields containing information about the layer 3 IP addresses and port numbers. DPI may be advantageously deployed within a PCC architecture of a 3GPP network or other telecommunications network in order to classify packet flows at a level deeper than that allowed by inspection of only the 5-Tuple vector.

DPI solutions may utilise header matching for IP, or may look into protocols over IP such as transport layer protocols (TCP, UDP) or application layer protocols (HTTP protocol, SIP protocol, some peer-to-peer protocols, FTP, RTSP, etc). Some DPI solutions may further or alternatively use patterns on statistical properties of the data flow, such as mean or variance of upstream/downstream packets, or jitter in packet sending. Other DPI solutions calculate simple correlation measurements between these quantities. A few solutions have even started to use data mining techniques to classify or cluster IP flows, sometimes using semi-supervised techniques to classify many similar unlabelled examples with just a few pre-labelled examples. Statistical properties, being numerical quantities, are amenable to data mining treatment.

According to the PCC based caching mechanism proposed here, the PCEF with embedded DPI capabilities, or with the cooperation of a node having such capabilities such as the TDF, identifies (or receives information about) material susceptible to be cached. Identification is carried our using criteria (possibly updated dynamically) provided to the PCEF (or TDF) by the PCRF. The PCEF may of course not inspect or report upon already cached content. Data suitable for caching is identified to the PCRF, which makes a decision as to whether or not caching should in fact be performed. The criteria used by the PCRF to select content to be cached might be based on data mining. For example, the PCRF may determine the decision criteria by analysing, during a certain period of time, a subscriber's preferred content, users' geographical distribution, what time the contents are accessed, which subscriber category accesses is inclined to access content of a certain type, etc. The PCRF may also look at the time of the day, a network operator's policies related to services with regard to certain users or to all users, the volume of content, number of users accessing a certain content, etc. The PCRF thus acts as an aggregator (it may look at information received from several PCEFs/TDFs) as well as a decision maker.

In the event that the PCRF decides to cache the inspected content, the PCRF instructs a Cache server within the operator's network domain to download the original content. The cache server will inform the PCRF of the URL mappings between the original material and the versions in the cache. These mapping may include a validity time to allow for content refreshment. The PCRF informs the PCEF that this has been done, so that further requests by the same user (or, in certain circumstances—see below—other users) relating to the now cached content can be redirected to the Cache server. As a result, the usage of data interfaces connecting the network operator's premises with further networks (such as the Internet) is reduced. One example of such a data interface whose signalling can be reduced is the "Gi" interface which links the GGSN of a mobile network operator with external packet data networks (PDNs). Furthermore, this approach allows network operators to select their own criteria for caching content (e.g. to optimise access speed to certain content), and should provide improved user experiences, as the number of transmission legs needed to reach certain data contents can be reduced.

Following the caching of data within the operator's network domain, redirection decisions are made in the PCEF. That is, if the PCEF detects that a UE is requesting access to certain data which is actually cached in the Cache server(s) of the same network domain, the UE is redirected to the Cache server instead of "extending" the request towards servers outside of the network operator domain. The PCEF, upon detecting a request addressed to a cached content, redirects such request to the caching server. The UE is therefore forced to request the cached content. Application connections (for example http, progressive http, etc) and transport connections (e.g. TCP) are established with the Cache server instead of the original Content server. Any TCP connections already associated with the original request may be closed.

The approach described here can reduce signalling between the network operator that provides access to a user terminal (UE, 8) and servers external to said network (e.g. Content Server 9). This may improve the user's experience when accessing content related to certain services, and may allow the network operator to prioritize caching or certain contents according to its own policies.

Figure 3:
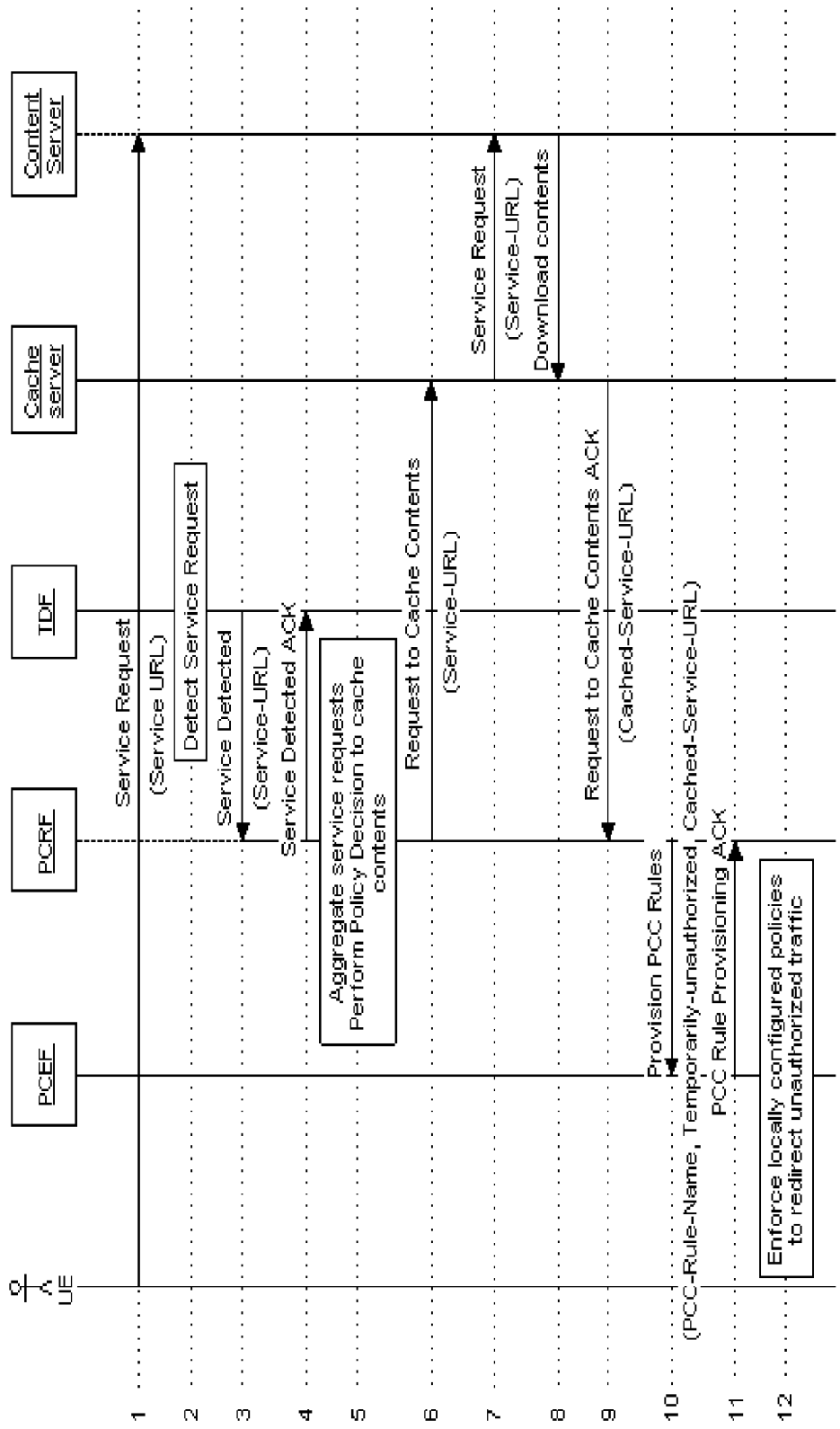
FIG. 3 is a signalling diagram illustrating a process for caching data within a PCC architecture.

FIG. 3 illustrates, at a high level, network signalling associated with a process for implementing caching within a PCC architecture. In the Figure, the PCEF and the TDF are shown as separate logical nodes. However, it will be appreciated that both entities can be collocated within the same entity. The Figure shows in particular the following signalling steps:

1. The UE sends a request to access certain content (e.g. identified by a service-URL).
2. The TDF, using DPI functionality, analyses traffic in order to determine if the content is a candidate for caching.
3. For content that is a candidate for caching, the TDF will notify the PCRF of an identifier of the content (e.g. the service-URL).
4. The PCRF stores the content identifier and then sends a response (ACK) to the TDF.
5. The PCRF then makes a caching decision. The PCRF may aggregate the number of accesses to the content (e.g. the PCRF may implement a counter which can be incremented with the number of accesses/retrieval of data relating to certain content/service and decide to cache certain data when the number of accesses/retrieval of that certain data reaches a predefined value), and/or may check operator policies to determine if the access to that content is subject to caching. If so, then steps 6 to 12 are carried out as follows.

6. The PCRF sends a request to cache the content to the Cache server. The request may include the service-URL of the content ("service URL"). Alternatively, or additionally, the request may contain for example an IP address or a domain name.
7. The Cache server sends a request to the Content Server to download the content.
8. The Content is downloaded and stored in the Cache server. The cache server can assign a validity timer for the contents to request refreshment.
9. The Cache server sends a response (including the cached-service-URL identifying the "location" of the cached content within the Cache server) to the PCRF to inform it that the content is cached.
10. The PCRF provisions one or more PCC Rules to the PCEF to inform the PCEF that (direct) access to the Content Server is temporarily unauthorised, and that requests relating to the cached data should be redirected to the Cache Server. Information allowing the PCEF to identify (e.g. with or without deep packet inspection) requests from UEs relating to cached data can be sent by the PCRF in this flow by including the corresponding URLs, IP-addresses, etc, in the PCC Rule(s). In order to prevent the PCEF from launching further queries to obtain the cached service URL, the cached service URL is also provisioned to the PCEF by the PCRF in this flow.
11. The PCEF stores the temporarily unauthorized PCC Rules and sends a response to the PCRF. The received (temporarily unauthorized) PCC Rules can be associated with a timer by the PCEF, so that after a certain time (e.g. as configured locally, or as indicated by the PCRF in the flow 10) these rules become obsolete. In this case, further requests relating to the (previously) cached data content will not be ordered to be redirected by the PCEF, but rather will be forwarded to the Content Server (i.e. as in the prior-art).
12. The PCEF enforces local policies to redirect further accesses to the service-URL to the cached-service-URL provided by the PCRF.

According to a modified approach, the PCC Rules (in flow 10) can indicate an applicability/extent of the Rules in respect of (current and/or future) traffic flows associated with IP-CAN sessions of: a given user terminal, a group of terminals, or any user terminal that associates (currently or subsequently) to the PCEF. Alternatively, the PCC Rules (in flow 10) can be sent in respect of a particular IP-CAN session of a given user terminal, and the receiving PCEF being arranged to subsequently apply these rules (with regard to the indicated cached content) to traffic flows associated with IP-CAN sessions of any of the user terminals associated with the PCEF (i.e.: currently associated, or that associate later). Furthermore, the PCRF may send similar information (e.g. PCC Rules) to one or more other PCEFs within the PCC architecture, so that further requests received in traffic flows of (current and/or future) IP-CAN sessions associated with these one or more further PCEFs are to be redirected by the PCEFs to the Cache Server, rather than merely routed forward as in the prior-art (i.e. towards the Content Server). This helps to reduce costs for the network operator(s) owning the involved IP-CAN network(s), since data traffic to/from servers outside its/their network domain (e.g. Content Server of FIG. 3) can be significantly diminished by redirecting some traffic to (cache) servers on its domain (e.g. Cache Server of FIG. 3).

A modification to the approach of FIG. 3 may involve the PCRF not providing the Cached-Service-URL to the PCEF in flow 10. In this case, when the PCEF detects a request relating to already cached data identified by a Service URL, it must send a query to the PCRF to obtain the associated Cached-Service-URL. This is likely to be a less optimal solution however.

Further network signalling (beyond the one illustrated in FIG. 3) can take place once a decision by the PCRF has been made for caching contents in the Cache Server, and the corresponding PCC Rules have been sent to one or more PCEFs (e.g. flow 10 in FIG. 3). For example, the Cache Server may delete some data content stored therein upon certain conditions (e.g. policies to delete less used/obsolete data contents) and can notify about this event to the PCRF; which, in turn, preferably notifies about this event to one or more PCEFs; e.g. by sending updated PCC Rules with regard to caching contents.

Figure 4:
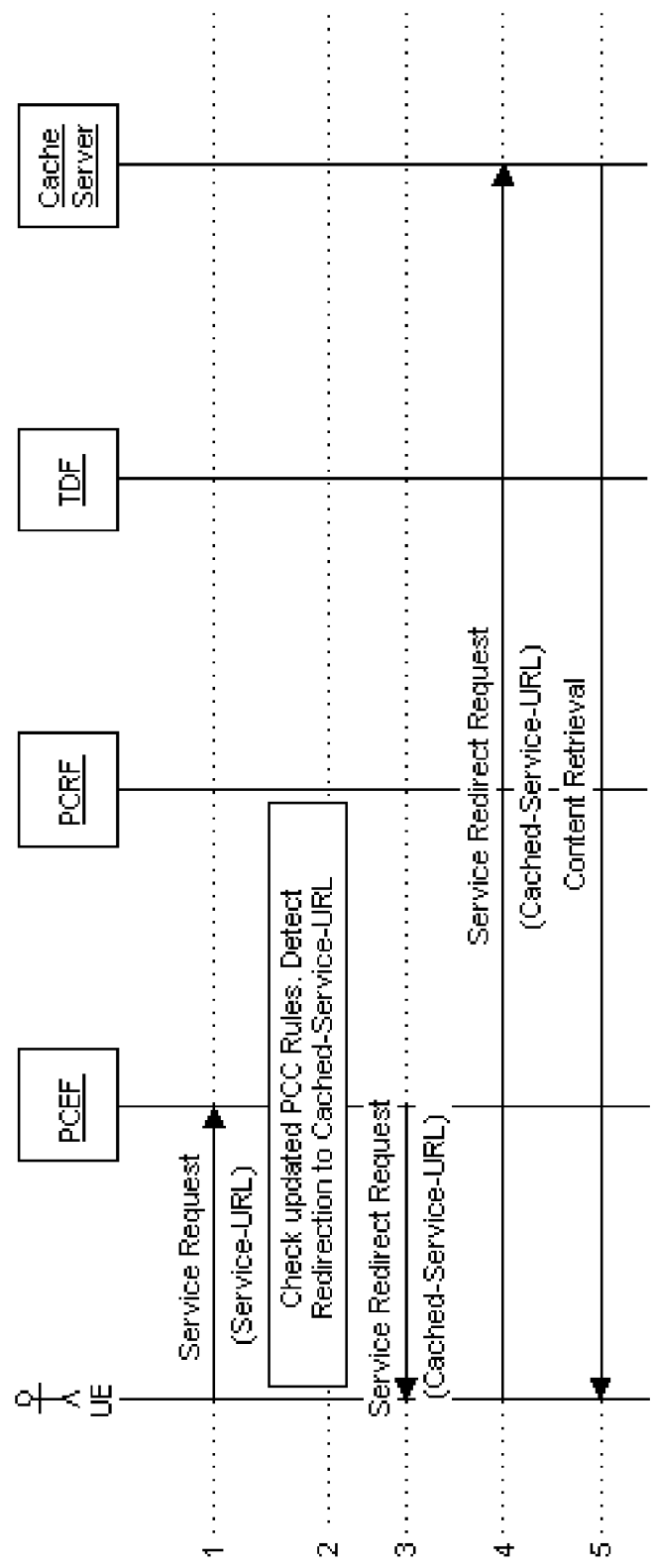
FIG. 4 is a signalling diagram illustrating a process for delivering cached data to a User Equipment (UE) from a cache server within a PCC architecture.

FIG. 4 illustrates the redirection mechanism (step 12 in FIG. 4) in more detail, again at a high level:
1. The UE sends a request to access a content (e.g. identified by a service-URL).
2. The PCEF identifies the requested content as cached content. This can imply that the PCEF (and or a specialized node such as the TDF) performs a deep and/or shallow packet inspection over the data flow(s) of the UE.
3-4. The PCEF initiates the redirection to the Cached Server (sending the Cached-Service-URL to the UE).
5. The UE retrieves the content from the Cache server.

Figure 5:
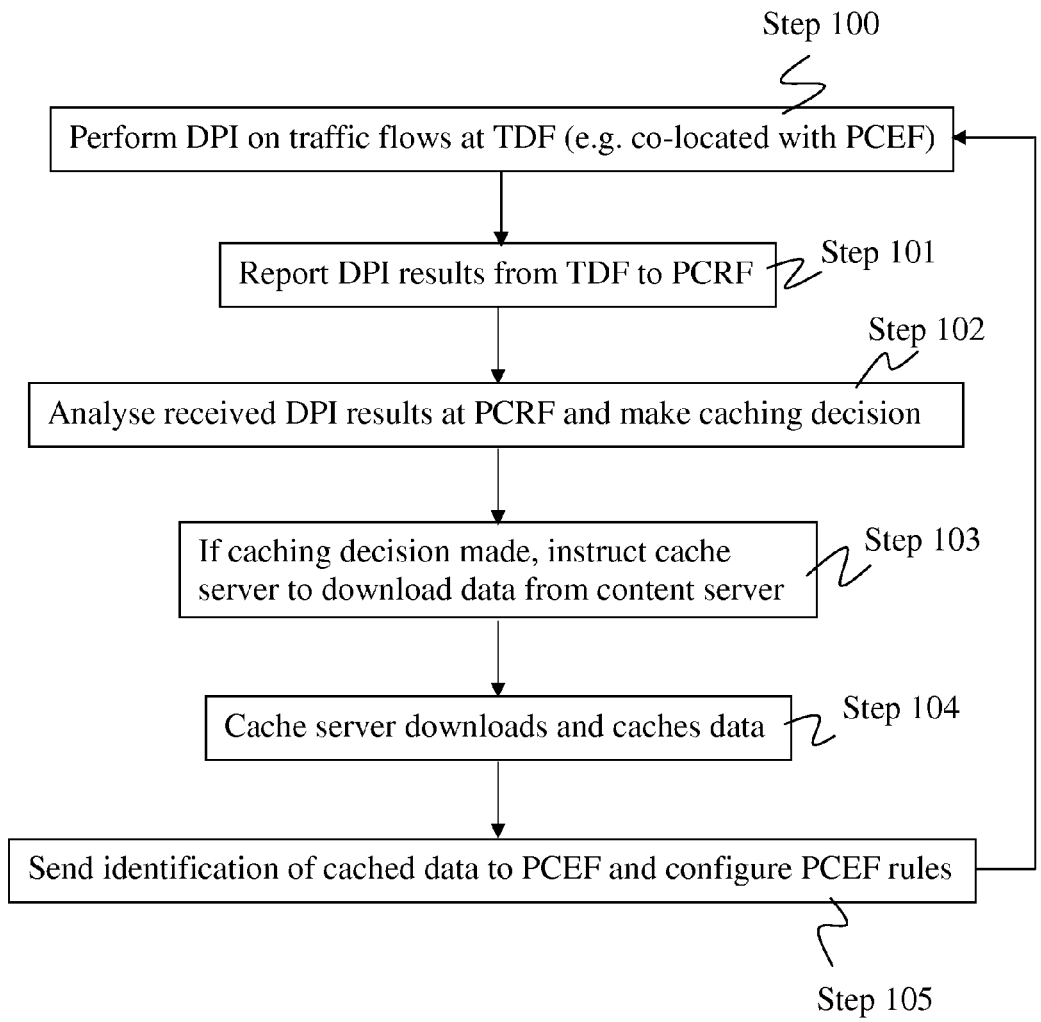
FIG. 5 is a flow diagram showing a caching decision process implemented within a PCC architecture.

FIG. 5 is a flow diagram further illustrating a procedure for making caching decisions within a PCC architecture. At step 100, the PCEF/TDF performs continuous DPI on traffic flows through the PCEF/TDF. This step may comprise some statistical analysis for tracking access to certain data contents. At step 101 the results of inspections are provided by the PCEF/TDF to the PCRF. The PCRF analyses the reported results at step 102, and makes caching decisions based upon collected information and, optionally, some predefined criteria. For example, caching decisions can be made based upon the network domain/s of the originally indicated destination Content Server/s, and/or based time upon the day, and/or based upon counters specifying the number of accesses related to certain data content, etc. If the PCRF makes a decision to cache certain content, then at step 103, the PCRF instructs a Cache server to cache the content. At step 104, the Cache server downloads the content from the content server, and caches the content. At step 105, the cached data is identified to the PCEF (and optionally to further PCEFs) by providing it with a mapping between the service-URL and the cached-service-URL.

Figure 6:
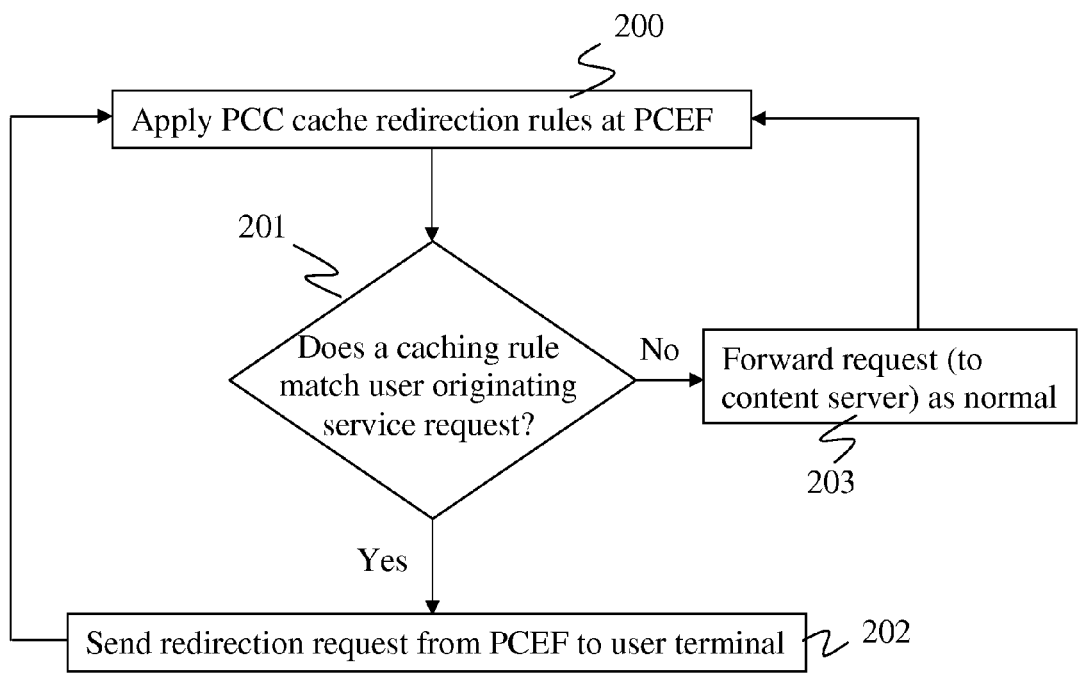
FIG. 6 is a flow diagram showing a process for delivering data content to a user terminal.

FIG. 6 is a flow diagram illustrating the procedure for providing cached content to a UE. At step 200, the PCEF applies the PCC caching rules provided to it by the PCRF. These rules are provided and applied by the PCEF on a per user basis although, as discussed above, an approach may be implemented that involves applying the rules to other users associated (i.e. currently associated, or which associate in the future) with the same or different PCEFs. If, at step 201, the PCEF determines that a service request received from a UE matches to one of the rules identifying cached data, then, at step 202, the PCEF sends a redirection request to the UE containing the cached-service URL. Otherwise, at step 203, the original service request is forwarded to the content server, outside of the network operator's domain.

Figure 7:
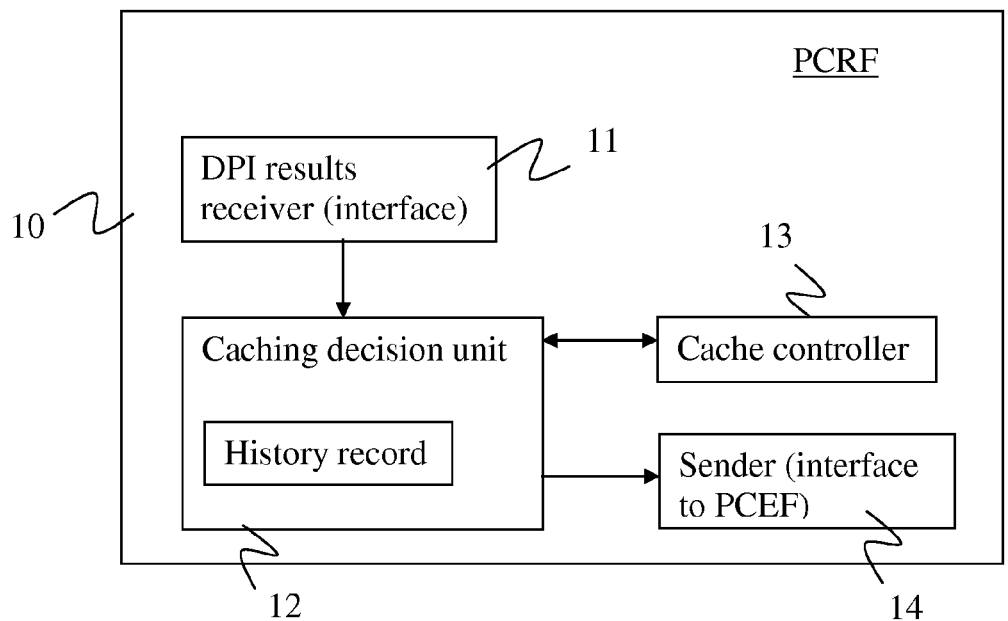
FIG. 7 illustrates schematically a Policy and Charging Rules Function (PCRF) node of a PCC architecture.

FIG. 7 illustrates schematically a PCRF 10 for use in the network architecture described above. It will be appreciated that the PCRF may be implemented by means of a network server, having the illustrated functional (hardware/software) components. These components include a DPI results receiver 11 for receiving the results of traffic flow analysis performed by the PCEF/TDF, including for example details of service-URLs identifying content suitable for caching. The DPI results receiver communicates the received results to a caching decision unit 12, which aggregates collected data and records this in history record. The caching decision unit also stores predefined criteria, and uses the recorded data to decide whether content identified to it (by the PCEF) should be cached. Decisions are passed to a cache controller 13 which is configured to communicate with a cache server (not shown). The caching decision unit 12 also communicates with a sender 14 which provides an interface for communicating with the PCEF (or PCEFs). Caching decisions are sent to the PCEF by the sender 13, including for example the service-URLs identifying cached content.

Figure 8:
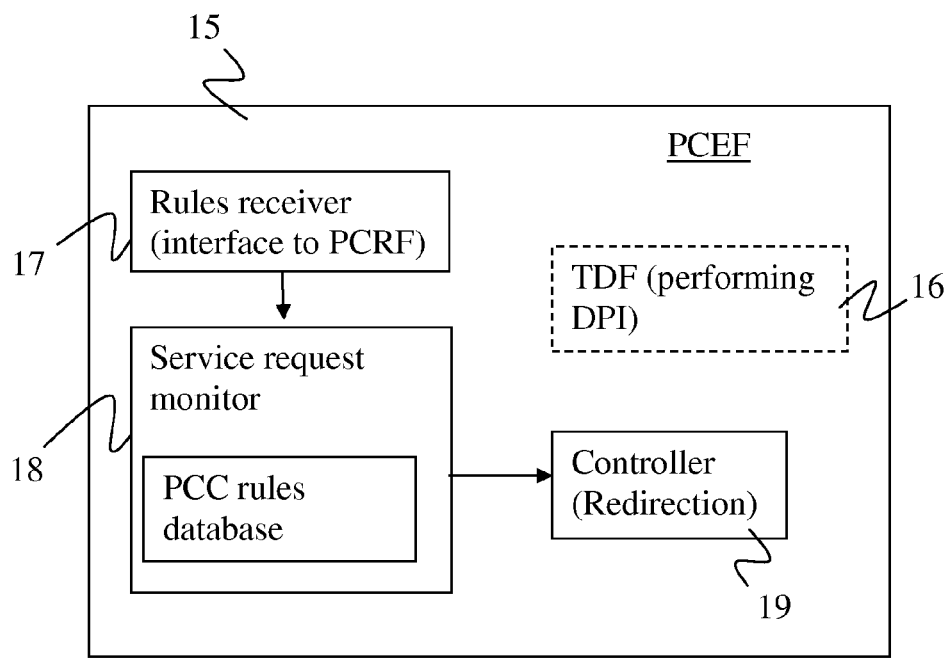
FIG. 8 illustrates schematically a Policy and Charging Enforcement Function (PCEF) node of a PCC architecture.

FIG. 8 illustrates schematically a PCEF 15. The PCEF optionally includes the TDF 16 which analyses packet flows through the PCEF and reports results to the PCRF. The PCEF comprises a rules receiver 17 which receives PCC rules from PCRF including rules identifying cached data. These rules are installed into a database of a service request monitor 18. The monitor 18 is configured to inspect UE originating service requests and to determine whether a service request relates to cached content. If so, then the request is passed to a redirection Controller 19 that is configured to return to the requesting UE a redirection request containing an identifier for the cached data, e.g. a cached-service-URL.

The embodiments described above disclose content caching decisions made on a per user basis, i.e. a caching decision is made by the PCRF in respect of content accessed by a particular user. However, other criteria can be envisaged, wherein the content caching decisions made by a PCRF are based on statistics obtained by inspecting (DPI) traffic flows related to a larger user base.

It will be appreciated by the person of skill in the art that various modifications may be made to the above described embodiments without departing from the scope of the present invention.

The invention claimed is:

1. A method of delivering user-requested content data to user terminals connected to an Internet Protocol Connectivity Access Network, IP-CAN, in response to data requests made by user terminals for accessing the content data, wherein the IP-CAN implements a Policy and Charging Control, PCC, architecture, the method comprising:
    performing Deep Packet Inspection (DPI) on certain traffic flows through the IP-CAN;
    reporting the DPI results to a Policy and Charging Rules Function, PCRF, of the PCC architecture;
    caching a copy of the user-requested content data within an IP-CAN cache server upon a decision made by the PCRF, of the PCC architecture;
    identifying the cached copy of the user-requested content data to a Policy and Charging Enforcement Function, PCEF, of the PCC architecture;
    at the PCEF, monitoring the data requests made by user terminals and determining if a request relates to a cached copy of user-requested content data; and
    if a request does relate to a cached copy of user-requested content data, then delivering that cached copy of user-requested content data from the IP-CAN cache server to the requesting user terminal,
    wherein the user-requested content data is not user specific because the user-requested content data is content data requestable by multiple different user terminals,
    wherein the PCRF makes the decision to cache a copy of user-requested content data in the IP-CAN cache server on the basis of said DPI results, and
    wherein said step of identifying the cached copy of user-requested content data to the PCEF includes sending the identification of the cached copy of user-requested content data from the PCRF to the PCEF.

2. A method according to claim 1, wherein said step of sending the identification of the cached copy of user-requested content data from the PCRF to the PCEF comprises including this identification within a provision of PCC Rules sent from the PCRF to the PCEF in respect of, and applicable to, traffic flows associated with IP-CAN sessions of a given user terminal.

3. A method according to claim 1, wherein said step of sending the identification of the cached copy of user-requested content data from the PCRF to the PCEF comprises including this identification in a provision of PCC Rules sent from the PCRF to the PCEF in respect of, and applicable to, traffic flows associated with IP-CAN sessions of all the user terminals associated with the PCEF.

4. A method according to claim 1, the PCRF additionally sending the identification of the cached copy of user-requested content data to one or more further PCEFs within the PCC architecture.

5. A method according to claim 1, said step of performing Deep Packet Inspection being carried out at a Traffic Decision Function, TDF, of the PCC architecture.

6. A method according to claim 5, said TDF being implemented either within a standalone network node or within a node implementing a PCEF.

7. A method according to claim 1, wherein said step of making a caching decision on the basis of said results at the PCRF, comprises incrementing a counter specifying a number of retrievals of a user-requested data item or set of user-requested data items identified in the result, and caching the user-requested data item or set of user-requested data items if the counter value has reached some predefined value.

8. A method according to claim 1, wherein said step of delivering the cached copy of user-requested content data to the requesting user terminal comprises sending a redirect request from the PCEF to the user terminal to cause the user terminal to request the cached copy of user-requested content data from the IP-CAN cache server.

9. A method according to claim 1, wherein said cached copy of user-requested content data is identified to the Policy and Charging Enforcement Function by way of a Service-Uniform Resource Locator, URL.

10. Apparatus configured to implement a Policy and Charging Rules Function, PCRF, within a Policy and Charging Control architecture of an Internet Protocol Connectivity Access Network, IP-CAN, the apparatus comprising:
    a receiver configured to receive Deep Packet Inspection (DPI) results on certain traffic flows through the IP-CAN initiated by data requests made by user terminals for accessing content data;
    a decision circuitry configured to make caching decisions to cache a copy of the user-requested content data on the basis of said results;

a cache controller configured to respond to caching decisions of the decision circuitry by caching a copy of user-requested content data within an IP-CAN cache server; and a sender configured to identify the cached copy of user-requested content data to one or more Policy and Charging Enforcement Functions, PCEFs, of the PCC architecture, wherein the user-requested content data is not user specific because the user-requested content data is content data requestable by multiple different user terminals, and wherein said sender is configured to send the identification of the cached copy of user-requested content data from the PCRF to the one or more PCEFs.

11. Apparatus according to claim 10, wherein said sender is configured to send to the or each PCEF, Provision PCC Rules requests containing identifications of cached copy of user-requested content data, or globally applicable rules containing the identifications.

12. Apparatus according to claim 10, said decision circuitry being configured to maintain a counter recording a number of retrievals of a data item or set of data items as reported by the DPI, and to make a decision to cache the user-requested content data item or set of user-requested content data items when the counter value has reached some predefined value.

13. Apparatus configured to implement a Policy and Charging Enforcement Function, PCEF, within a Policy and Charging Control architecture of an Internet Protocol Connectivity Access Network, IP-CAN, the apparatus comprising:

a receiver configured to receive from a Policy and Charging Rules Function, PCRF, an identification of a copy of user-requested content data cached within the IP-CAN, the PCRF having made the decision to cache the copy of user-requested content data in an IP-CAN cache server on the basis of Deep Packet Inspection (DPI) on certain traffic flows through the IP-CAN;

a monitor configured to monitor data requests made by user terminals and for determining if a request relates to a cached copy of user-requested content data based upon said identification; and a controller configured to cause a user terminal to retrieve a cached copy of user-requested content data from the IP-CAN cache in the event that such a determination is made, wherein the user-requested content data is not user specific because the user-requested content data is content data requestable by multiple different user terminals.

14. Apparatus according to claim 13, wherein said identification is a Service Uniform Resource Locator, Service-URL, and said monitor is configured to monitor requests to identify request that relate to that Service URL.

15. Apparatus according to claim 14, said controller being configured to cause a user terminal to retrieve cached copy of user-requested data from the IP-CAN cache by sending a redirection request to the user terminal containing a cached service URL.

* * * * *